Nov. 5, 1968
R. G. MOYER
3,409,218
APPARATUS FOR CLEANING AND FILLING AUTOMOTIVE
ENGINE COOLING SYSTEMS
Filed March 21, 1967
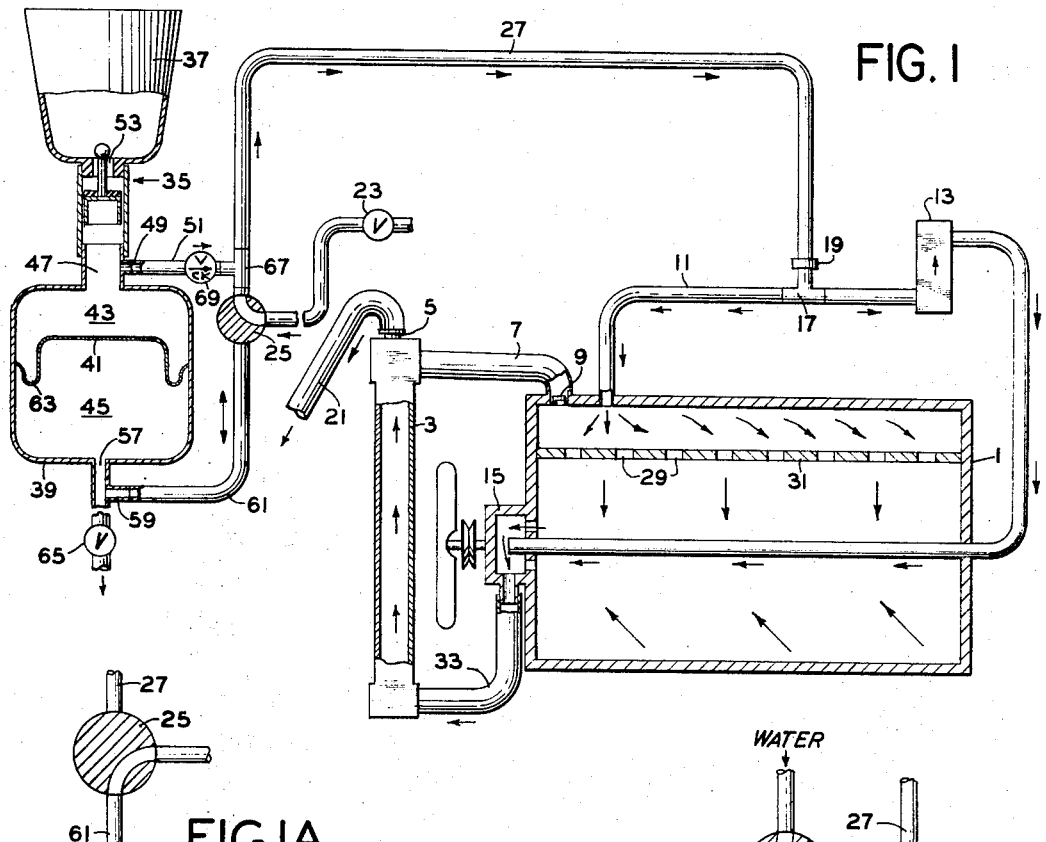
FIG. 1
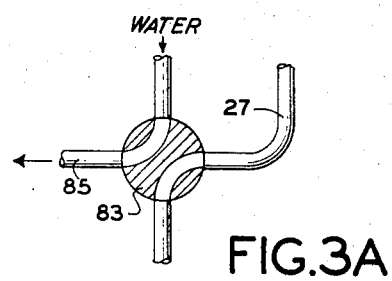
FIG.1A
FIG.3A
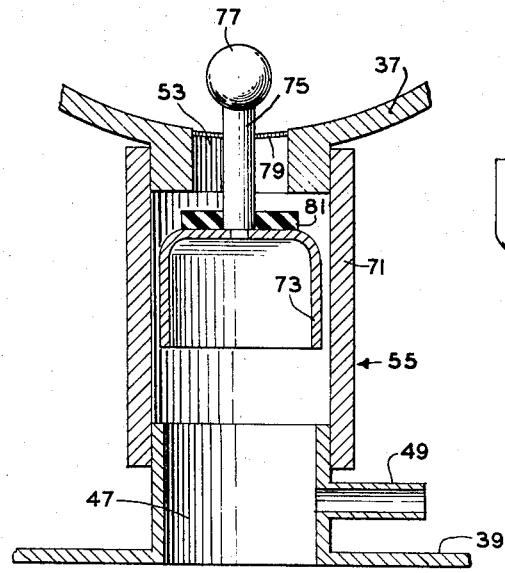
FIG.2
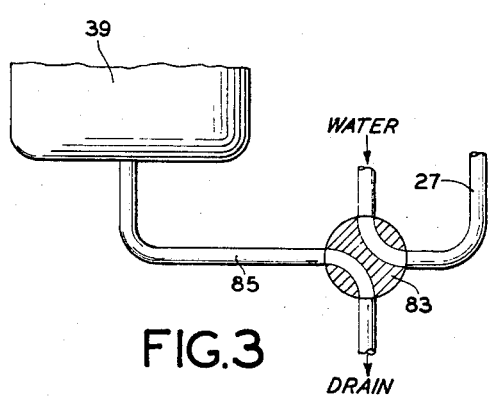
FIG.3
INVENTOR
ROBERT G. MOYER
BY
ATTORNEY United States Patent Office 3,409,218
Patented Nov. 5, 1968

3,409,218
APPARATUS FOR CLEANING AND FILLING AUTOMOTIVE ENGINE COOLING SYSTEMS
Robert G. Moyer, Ridgefield, Conn., assignor to Union Carbide Corporation, a corporation of New York
Filed Mar. 21, 1967, Ser. No. 624,820
10 Claims. (Cl. 237—12.3)

ABSTRACT OF THE DISCLOSURE

Apparatus for cleaning an automotive engine cooling system and for introducing new coolant into the system is provided. Fresh water from a convenient source of pressurized water supply, e.g., normal city water, is fed through a control valve to the heater hose of the cooling system. When the cooling system is sufficiently cleaned with fresh water, the control valve is changed to supply pressurized water to a hydraulic operated coolant distributor. This distributor consists of a distribution tank having a rolling diaphragm which divides its interior into an upper coolant reservoir and a lower water chamber to which the pressurized water is fed. The new coolant is placed within a coolant receptacle located above the distribution tank and is allowed to flow by gravity past a float valve and into the coolant reservoir of the tank. Hydraulic pressure within the water chamber of the tank causes the diaphragm to move upward and to force the new coolant from the coolant reservoir and into the automotive cooling system.

Background of the invention

This invention relates to the cleaning and refilling of automotive engine cooling systems. More particularly, the invention relates to an apparatus for both flushing an automotive engine cooling system and for refilling the system with water and coolant.

In U.S. Patent No. 3,188,006 issued to H. J. Falk on June 8, 1965, there is disclosed and claimed a novel and improved apparatus for flushing and introducing new or fresh coolant, e.g., antifreeze or summer rust inhibitor, into the cooling system of an automotive engine. In operation, the apparatus is connected into the automotive cooling system through the heater hose which supplies hot water from the engine block to the heater inside of the automobile for heating the latter during periods of cold weather. This connection is made by the simple expedient of a T-connection interposed at any convenient point along the heater hose between the heater and the automotive engine block.

The apparatus includes a two-way valve gun connected to a convenient source of fresh water supply, e.g., normal city water, and to a coolant receptacle or tank containing the new coolant to be introduced into the automotive cooling system. This coolant receptacle or tank communicates with a source of air pressure for forcing the coolant therefrom, usually a compressor or air pump driven by an electric motor.

Fresh water is first introduced into the automotive cooling system through the two-way valve gun to flush the old coolant from the system. The water follows a path through the automotive engine block to the water pump and then to the radiator of the cooling system where it is emptied throught he radiator filler neck. Some of the flush water by-passes the engine block and flows through the heater inside the automobile from where it then passes to the water pump, thereby also flushing this portion of the cooling system.

After the automotive cooling system has been cleaned or flushed with fresh water, the two-way valve gun is opened to allow the new coolant to then pass from the coolant receptacle or tank under the influence of compressed air from the compressor or pump into the cooling system, thus refilling the system with water and coolant.

While the above-described apparatus has proven capable of quickly and easily cleaning an automotive cooling system with fresh water and refilling the system with new coolant in such manner that a considerable amount of time and expense is saved each time this maintenance procedure is performed, there is the problem that such apparatus requires the use of a source of compressed air which may not always be available. Moreover, if the apparatus is equipped with a compressor or air pump, for example, this requires the use of an electric motor which increases the cost and maintenance of the apparatus. Furthermore, the use of a compressor or pump powered by an electric motor requires that certain safety standards be met especially when the apparatus is being used in an area where high volatile matter such as gasoline and oil are being maintained.

Objects of the invention

It is an object of this invention to provide a novel and improved apparatus for quickly and easily removing all of the old coolant from an automotive cooling system and for refilling the system with new coolant.

More specifically, another object of this invention is to provide a novel and improved apparatus for flushing and introducing new coolant into an automotive cooling system which does not require the use of a compressor or air pump powered by an electric motor and which can be safely operated in an environment wherein high volatile matter such as gasoline or oil are maintained.

Summary of the invention

This invention contemplates the provision of a novel and improved apparatus for cleaning an automotive cooling system and for refilling the system with new coolant and water. Briefly stated, the apparatus of the invention comprises the combination of an hydraulic-operated coolant distributor and a control valve for alternately supplying fresh water from a convenient source of pressurized water to the automotive cooling system for flushing the old coolant from the system and then to the hydraulic coolant distributor for introducing the new coolant into the system. The hydraulic coolant distributor comprises a distribution tank having a rolling diaphragm which divides its interior into an upper coolant reservoir and a lower water chamber. When the control valve is positioned for introducing new coolant into the automotive cooling system, pressurized water is fed to the water chamber which causes the rolling diaphragm to move upward within the tank and to force the coolant from the coolant reservoir into the cooling system. The coolant may be supplied from a coolant receptacle located above the hydraulic distributor tank and a float valve may be provided therebetween for allowing the coolant to pass freely from the receptacle to the coolant reservoir, while at the same time prohibiting the coolant from re-entering the receptacle when the coolant is forced from the coolant reservoir into the cooling system. Since the apparatus is hydraulically operated, there is no need for a compressed air supply such as an electric motor-operated compressor or air pump.

When using the apparatus of the invention, the operation of cleaning and refilling the automotive cooling system is essentially the same as that described in the before mentioned U.S. Patent No. 3,188,006 to H. J. Falk, wherein both the fresh water to flush the cooling system and the new coolant are introduced through the heater supply hose of the cooling system. During this operation, there is no need to open any of the drain plugs or to remove the thermostat ordinarily employed in the cooling system, nor is it required that the cooling system be emptied at any given time. Thus the cooling system may be quickly and easily cleaned and the new coolant installed.

Brief description of the drawing

FIGURE 1 is a schematic view of apparatus of the invention shown together with a conventional automotive cooling system;

FIGURE 1A is a partial schematic view of the apparatus of FIGURE 1 showing the control valve in its operative position for introducing new coolant into the automotive cooling system;

FIGURE 2 is an enlarged sectional view of the preferred form of float valve employed in the apparatus of the invention;

FIGURE 3 is a partial schematic view showing a modified form of the apparatus of the invention; and FIGURE 3A is a partial schematic view of the modified apparatus of FIGURE 3 showing the control valve in its operative position for introducing new coolant into the automotive cooling system.

Description of the preferred embodiments

With reference to the drawing and particularly to FIGURE 1, there is shown a conventional automotive engine cooling system comprising an engine block 1, a radiator 3 having a filler neck 5, an upper radiator hose 7 connected between the radiator and engine block and thermostat 9 which is in the closed position as shown.

Heater hose 11 connects heater 13 to the engine block and to water pump 15. As shown in the drawing, a T-connection 17 is installed in the heater hose 11 and connected thereto is the flush-fill adaptor 19 of the apparatus of the invention.

In the operation of cleaning and flushing the automotive cooling system, the radiator 3 is open at the filler neck 5 and an overflow deflector cap 21 is installed. Pressurized water from any convenient water supply 23 is then introduced through a three-way control valve 25 and the flush-fill conduit 27 into the heater hose 11 of the cooling system.

The pressurized flush water which can be the city water supply (approximately 70 p.s.i.) causes displacement of the old coolant in the system by taking advantage of the normal distribution patterns in the engine which are illustrated in FIGURE 1. As shown in FIGURE 1, the pressurized flush water upon entering the heater hose 11 through T-connection 17, splits into two paths. Part of the flush water flows into the cylinder head through the distribution holes 29 in head gasket 31, to the water pump 15, then through the lower radiator hose 33, up through the radiator 3 and finally out of the cooling system through radiator filler neck 5.

The other portion of the pressurized flush water flows from T-connection 17 through heater 13, then to water pump 15 where it rejoins the first portion of flush water and finally exits the radiator filler neck 5. The only area that is not effectively pressure flushed is the upper radiator hose 7. However, even this can be purged of the old coolant by squeezing the hose a number of times by hand during the latter portion of the flushing operation so as to exchange the old coolant in the radiator hose 7 with fresh flush water flowing through the top tank. At normal city water pressures (approximately 70 p.s.i.) the cooling system is changed 3 to 4 times in one minute. This is sufficient to provide a clean system completely free from contamination with the previous coolant.

As illustrated in FIGURE 1, there is provided an hydraulic-operated coolant distributor 35 in apparatus of the invention for introducing the new coolant into the automotive cooling system. The coolant distributor 35 consists of a coolant receptacle 37 into which the new coolant is placed and a distribution tank 39 from which the coolant is delivered by means of hydraulic pressure to the automotive cooling system as shall be described in greater detail hereinafter.

Distribution tank 39 is of a design which is somewhat similar to that of a conventional expansion tank used in various types of heating systems. Within the tank 39 is a rolling diaphragm 41 which is mounted at a point intermediate the top and bottom thereof. This diaphragm 41 divides the interior of tank 39 into two separate chambers, i.e., an upper chamber or reservoir 43 for the coolant and a lower chamber 45 for water. The diaphragm 41 is made of a tough, flexible, liquid impervious material such as rubber and the like, and is adapted to move in both an upward and downward direction from the top to the bottom of tank 39.

Within the top of the distribution tank 39 is a coolant opening 47 communicating with the coolant reservoir 43. This coolant opening 47 is provided with a T-section 49 to which is connected the conduit 51 for delivering the coolant from the tank 39 to the automotive cooling system.

Coolant receptacle 37 communicates through its bottom outlet 53 with the coolant opening 47 of tank 39 by way of a float valve as at 55. Float valve 55 permits the flow of liquid from the bottom of coolant receptacle 37 but prevents air from passing from the receptacle into the automotive cooling system when the liquid coolant has been exhausted.

Within the bottom of tank 39 is a water passage opening 57. This bottom opening 57 is provided with a T-section 59 to which is connected the conduit 61. Conduit 61 communicates with the water supply 23 through the two-way control valve 25 which is closed to conduit 61 in the position shown in FIGURE 1.

While the automotive cooling system is being cleaned or flushed of old coolant in the manner as above described, it is convenient to charge the desired amount of new coolant, e.g., anti-freeze or summer rust inhibitor, into apparatus of the invention. The coolant is placed within the coolant receptacle 37 from which it is allowed to flow by gravity passed the float valve 55 and into the coolant reservoir 43 of distributor tank 39. Under the weight of the coolant entering the coolant reservoir 43, the rolling diaphragm 41 is caused to move downward toward the bottom of tank 39. In order to facilitate the expansion of diaphragm 41 as it moves downward within the tank 39, the diaphragm 41 may be suitably bellowed or folded as at 63. All of the coolant from the coolant receptacle 37 flows into the coolant reservoir 43 above the diaphragm 41 and depending on the amount of coolant used, eventually fills or nearly fills the interior of tank 39.

If any water is present within the water chamber 45 of distributor tank 39 such as might be the case where the apparatus of the invention has just been previously used, this water must be emptied prior to or while the coolant is being charged into the coolant receptacle 37. This is conveniently accomplished by opening the drain valve 65 which is located beneath the water passage opening 57 within the bottom of distributor tank 39.

After the automotive cooling system has been cleaned or flushed and the old coolant replaced with clean water as hereinbefore described, the control valve 25 is changed to its second position as illustrated in FIGURE 1A. In this position of valve 25, pressurized water is introduced from the water supply 23 by way of conduit 61 into the water chamber 45 of the distributor tank 39. Drain valve 65 is closed prior to commencing this operation. As the pressurized water enters the water chamber 45, the diaphragm 41 is caused to move upward by hydraulic pressure and to force the coolant from the coolant reservoir 43. The coolant passes through the coolant opening 47 within the top of tank 39 forcing any entrapped air ahead of it which then passes through the float valve 55 where it escapes through the coolant receptacle 37. As soon as the coolant rises to the level of the bottom receptacle outlet 53, the float valve 55 closes and the coolant is then forced out from the coolant reservoir 43, through the T-section 49 and into the conduit 51 from whence it is introduced into the automotive cooling system.

As shown in FIGURE 1, the coolant may be conveniently introduced into the automotive cooling system through the main flush fill conduit 27 after the system has been cleaned of old coolant and replaced with fresh water from the water supply 23. In this preferred embodiment of the invention, the coolant is forced through the conduit 51 which is connected to the flush-fill conduit 27 by a T-connection 67 located ahead of control valve 25 and then enters the cooling system through the heater hose 11 by way of adaptor 19 in the same manner as the flush water during the cleaning operation. A check valve 69 is then provided within the conduit 51 for preventing the pressurized water from entering the coolant distributor 35 when the cooling system is being cleaned. Of course, it is entirely possible to introduce the coolant into the cooling systems directly through the conduit 51 by connecting the latter into the radiator hose 11 in any suitable manner such as by use of another adaptor 19. The adapter 19 may be any standard female threaded fitting conventionally used for garden hose and the like. While the latter arrangement eliminates the need for the check valve 69, it nevertheless requires that the flush-fill conduit 27 be disconnected and a new connection made for the conduit 51 each time the apparatus is used to clean and refill the cooling systems.

FIGURE 2 shows in greater detail the construction of the preferred form of float valve 55. As illustrated, the float valve 55 consists of a tubular housing 71 connected at its upper end to the bottom outlet 53 of coolant receptacle 37 and at its lower end to the coolant opening 47 of the distribution tank 39. Within this tubular housing 71 is an inverted cup shaped float 73 which is supported by rod 75 having a knob 77 at its top end. Rod 75 is slidably mounted within a metal screen 79 fitted within the bottom outlet 53 of coolant receptacle 37. Mounted on top of the cupped shaped float 73 is a sealing washer 81 of any suitable gasket material such as soft rubber and the like. In operation of the float valve 55, air forced from within the coolant reservoir 43 ahead of the coolant passes around the cupped float 73 and escapes through bottom outlet 53 of coolant receptacle 37. When coolant moving upward from within coolant reservoir 43 reaches the cupped float 73, it traps air which buoys the cupped float 73 upward, thereby causing the sealing washer 81 to seal off the bottom outlet 53 of coolant receptacle 37. When the liquid coolant is moving downward from within the coolant receptacle 37, the float 73 descends until the knob 77 on the end of the rod 75 is stopped by the metal screen 79. Screen 79 also serves to remove any large particles of dirt from the coolant as it passes into the distribution tank 39. Of course, it will be understood that any other type of float valve may be used such as the conventional ball type float valve.

In FIGURES 3 and 3A, a modification of apparatus of the invention is illustrated. In this modification, the control valve 25 is replaced by a four-way valve 83 and the drain valve 65 is eliminated. The operation of the apparatus is essentially the same as already described. Control valve 83 is first set to the position as shown in FIGURE 3. In this position, pressurized water from the water supply is fed to the flush-fill conduit 27 by way of control valve 83 for cleaning and flushing the automotive cooling system. At the same time water is drained from within the water chamber 45 of distribution tank 39 by way of conduit 85. After the cooling system has been sufficiently cleaned of the old coolant, the control valve 83 is changed to its second position as shown in FIGURE 3A. In this position, pressurized water is fed by way of conduit 85 to the water chamber 45 which then forces the coolant by hydraulic pressure from the coolant reservoir 43 and into the cooling system in the manner as before described.

In the practice of the invention, the first time an automobile is serviced by this technique, two pinch clamps are placed approximately four inches apart at an accessible portion of the heater supply hose 11. The hose 11 is then cut and the T-connection 17 is inserted in line with the heater hose 11 and locked in place with spring-type hose clamps. The flush-fill adaptor 19 is then connected to the T-connection 17. The T-connection 17 has a standard male threaded fitting thereon of the garden hose type which can be sealed with a plastic female threaded cap. As indicated above, the adaptor 19 is a standard female garden type hose fitting which can be readily secured onto the T-connection 17.

From the foregoing it can be seen that the invention provides a novel and improved apparatus for cleaning or flushing old coolant from an automotive cooling system and for introducing new coolant into the cooling systems which is operated solely by hydraulic pressure from any convenient water supply such as normal city water. The use of an electric motor-operated compressor or air pump is eliminated and the apparatus can be used safely in an environment wherein high volatile matter such as gasoline or oil are maintained.

What is claimed is:

1. Apparatus for flushing old coolant and introducing new coolant into an automotive engine cooling system having a heater and a heated supply hose for circulating hot water between said heater and the automotive engine block, which comprises in combination:
    (a) an hydraulic-operated coolant distributor comprising a distribution tank having a rolling diaphragm dividing the interior thereof into an upper coolant reservoir and a lower water chamber;
    (b) a control valve for alternately supplying fresh water from a pressurized water supply to said heater hose for flushing the old coolant from said cooling system and then to the water chamber of said distribution tank to cause said diaphragm to move upward therein and to force the new coolant therefrom;
    (c) first conduit means communicating between said control valve and the heater hose of said cooling system between said control valve and said water chamber; and
    (d) second conduit means communicating with the coolant reservoir of said distribution tank for delivering the new coolant to the automotive coolant systems.

2. Apparatus as defined by claim 1 wherein a coolant receptacle is located above the distribution tank for supplying the new coolant to said coolant reservoir and wherein a float valve is provided therebetween for preventing the new coolant from re-entering said receptacle when forced from said distribution tank.

3. Apparatus as defined by claim 2 wherein the float valve comprises a housing having mounted therein an inverted cupped float provided at its top end with a sealing gasket adapted to seal the coolant receptacle against the passage of coolant.

4. Apparatus as defined by claim 1 wherein the second conduit means is connected into said first conduit means for delivering the new coolant to the automotive cooling systems.

5. Apparatus as defined by claim 1 wherein a drain valve is provided for draining water from said water chamber.

6. Apparatus as defined by claim 1 wherein the control valve is a three-way valve communicating between said water supply and the heater hose of said cooling system in one position thereof and between said water supply and the water chamber of said distribution tank in the other position thereof.

7. Apparatus as defined by claim 1 wherein the control valve is a four-way valve communicating between said water supply and the heater hose of said cooling system in one position thereof and in another position communicating between said water supply and the water chamber of said distribution tank and between said water chamber and a drain.

8. Apparatus for flushing old coolant and introducing new coolant into an automotive cooling system having a heater and a heater supply hose for circulating hot water between said heater and the automotive engine block, which comprises in combination:
   (a) an hydraulic-operated coolant distributor comprising a distribution tank having a rolling diaphragm dividing the interior thereof into an upper coolant reservoir and a lower water chamber;
   (b) a coolant receptacle located above the distribution tank for supplying the new coolant to said coolant reservoir;
   (c) a float valve provided between said coolant receptacle and said distribution tank;
   (d) a control valve for alternately supplying fresh water from a pressurized water supply to said heater hose for flushing the old coolant from said cooling system and then to the water chamber of said distribution tank to cause said diaphragm to move upward therein and to force the new coolant from said coolant reservoir;
   (e) first conduit means communicating between said control valve and the heater hose of said cooling system;
   (f) second conduit means communicating between said control valve and the water chamber of said distribution tank; and
   (g) third conduit means communicating between said coolant reservoir and said first conduit means for delivering the new coolant into the automotive cooling system.

9. Apparatus as defined by claim 8 wherein a check valve is provided within said third conduit means for preventing pressurized water from entering the coolant reservoir of said distribution tank.

10. Apparatus as defined by claim 8 wherein a drain valve is provided for draining water from the water chamber of said distribution tank.

References Cited
UNITED STATES PATENTS 3,188,006    6/1965    Falk _____ 237—8

EDWARD J. MICHAEL, *Primary Examiner.*

PO-1050
(5/69)

UNITED STATES PATENT OFFICE
CERTIFICATE OF CORRECTION

Patent No. 3,409,218.  Dated November 5, 1968

Inventor(s) R. G. Moyer

It is certified that error appears in the above-identified patent and that said Letters Patent are hereby corrected as shown below:

Column 1, line 65 "throught he" should read --through the--.

Column 6, line 42, claim 1, the word "and" should be inserted after "system."

SIGNED AND
SEALED
SEP 15 1970

(SEAL)
Attest:

Edward M. Fletcher, Jr.
Attesting Officer

WILLIAM E. SCHUYLER, JR.
Commissioner of Patents